US009088439B2

(12) United States Patent
Saidi et al.

(10) Patent No.: US 9,088,439 B2
(45) Date of Patent: Jul. 21, 2015

(54) NETWORKING DEVICE, SYSTEM AND METHOD FOR THE CREATION OF PORTABLE PROXIMITY COMMUNICATION NETWORKS

(76) Inventors: Armine Saidi, Montreal (CA); David Esteves, Montreal (CA); Sarath Kumar Kumaraiah, Laval (CA)

( * ) Notice: Subject to any disclaimer, the term of this patent is extended or adjusted under 35 U.S.C. 154(b) by 0 days.

(21) Appl. No.: 13/464,642

(22) Filed: May 4, 2012

(65) Prior Publication Data

US 2012/0284412 A1 Nov. 8, 2012

Related U.S. Application Data

(60) Provisional application No. 61/482,804, filed on May 5, 2011.

(51) Int. Cl.
| | |
|---|---|
| *G06F 15/16* | (2006.01) |
| *H04L 12/64* | (2006.01) |
| *H04W 48/18* | (2009.01) |
| *H04W 88/06* | (2009.01) |
| *H04W 88/04* | (2009.01) |
| *H04W 72/04* | (2009.01) |

(52) U.S. Cl.
CPC ........... *H04L 12/6418* (2013.01); *H04W 48/18* (2013.01); *H04W 72/0406* (2013.01); *H04W 72/0413* (2013.01); *H04W 88/04* (2013.01); *H04W 88/06* (2013.01)

(58) Field of Classification Search
CPC ................... H04W 72/0406; H04W 72/0413; H04W 48/18; H04W 88/04; H04W 88/06
USPC ................. 709/200–203, 217–227, 228, 229; 455/41.2, 436, 452.1; 370/329, 331
See application file for complete search history.

(56) References Cited

U.S. PATENT DOCUMENTS

| | | | | |
|---|---|---|---|---|
| 6,505,049 | B1 * | 1/2003 | Dorenbosch ............... | 455/456.2 |
| 6,954,443 | B2 * | 10/2005 | Forstadius et al. ............ | 370/331 |
| 6,987,975 | B1 * | 1/2006 | Irvin et al. ................. | 455/456.1 |
| 7,194,257 | B2 * | 3/2007 | House et al. .................. | 455/418 |
| 7,277,049 | B2 * | 10/2007 | Korneluk et al. ........ | 342/357.42 |
| 7,606,578 | B2 * | 10/2009 | Irvin et al. ................. | 455/456.1 |
| 7,929,010 | B2 * | 4/2011 | Narasimhan ............... | 348/14.01 |
| 7,970,351 | B2 * | 6/2011 | Jabara et al. ................. | 455/41.2 |
| 8,050,688 | B2 * | 11/2011 | Jacob ......................... | 455/456.1 |
| 8,190,119 | B2 * | 5/2012 | Jabara et al. ............... | 455/404.2 |
| 8,280,357 | B2 * | 10/2012 | Eisinger et al. ............ | 455/414.1 |
| 8,331,987 | B2 * | 12/2012 | Rosenblatt ................. | 455/556.2 |
| 8,364,139 | B2 * | 1/2013 | Rosenblatt .................... | 455/420 |
| 8,369,846 | B2 * | 2/2013 | Rosenblatt .................... | 455/420 |
| 8,401,030 | B2 * | 3/2013 | Chaudhri et al. ............. | 370/406 |
| 8,503,677 | B2 * | 8/2013 | Yao et al. ...................... | 380/255 |
| 2006/0058039 | A1 * | 3/2006 | Irvin et al. ................. | 455/456.1 |
| 2006/0141991 | A1 * | 6/2006 | House et al. ............... | 455/412.1 |
| 2006/0166683 | A1 * | 7/2006 | Sharma et al. ............. | 455/456.5 |
| 2007/0024498 | A1 * | 2/2007 | Korneluk et al. ........ | 342/357.09 |
| 2008/0261529 | A1 * | 10/2008 | Rosenblatt ................... | 455/41.3 |
| 2010/0144357 | A1 * | 6/2010 | Chaudhri et al. ............. | 455/450 |
| 2011/0188653 | A1 * | 8/2011 | Yao et al. ...................... | 380/255 |
| 2011/0201275 | A1 * | 8/2011 | Jabara et al. ................. | 455/41.2 |
| 2012/0003965 | A1 * | 1/2012 | Eisinger et al. ............ | 455/414.1 |
| 2012/0202185 | A1 * | 8/2012 | Jabara et al. .................. | 434/350 |

* cited by examiner

*Primary Examiner* — Moustafa M Meky
(74) *Attorney, Agent, or Firm* — BCF LLP

(57) ABSTRACT

The present disclosure relates to a networking device, a system and a method for the creation of a portable proximity communication network. A networking device comprises a communication interface and a networking component for establishing connections of the networking device, via the communication interface, with any one of a plurality of communication devices. The networking component is capable of establishing a connection with a peer networking device for creating a long range based communication network.

17 Claims, 3 Drawing Sheets

NETWORKING DEVICE, SYSTEM AND METHOD FOR THE CREATION OF PORTABLE PROXIMITY COMMUNICATION NETWORKS

TECHNICAL FIELD

The present disclosure relates to a networking device, a system and a method for the creation of portable proximity communication networks.

BACKGROUND

Computers and communications devices such as personal computers (PC), laptop computers, tablet PCs, personal assistant devices (PDA), mobile phones, smart phones and other similar devices have become commonplace.

There is, however, a need for an easy way for people in the same physical space to anonymously communicate, broadcast content and exchange files at any given location without having to go through a cellular/mobile network and/or an Internet Service Provider, and/or any traditional internet based platforms.

BRIEF DESCRIPTION OF THE FIGURES

Embodiments of the disclosure will be described by way of example only with reference to the accompanying drawing, in which.

DETAILED DESCRIPTION

Generally stated, a non-limitative illustrative embodiment of the present disclosure provides a networking device, a system and a method for the creation of a portable proximity communication network. Such proximity communication network may be extended by further connection to another proximity communication network to form long range based broadcasting and communication networks. Communication in the proximity communication network and in the and long range based broadcasting and communication networks may use wireless transmission and reception channels. These networks can be used, for example, for local based e-commerce medium platforms. Access to the portable proximity and long range based wireless broadcasting and communication network can be, for example, free of charge, sponsor based, in exchange of monetary funds, in exchange of user data or any authentication process.

Figure 1:
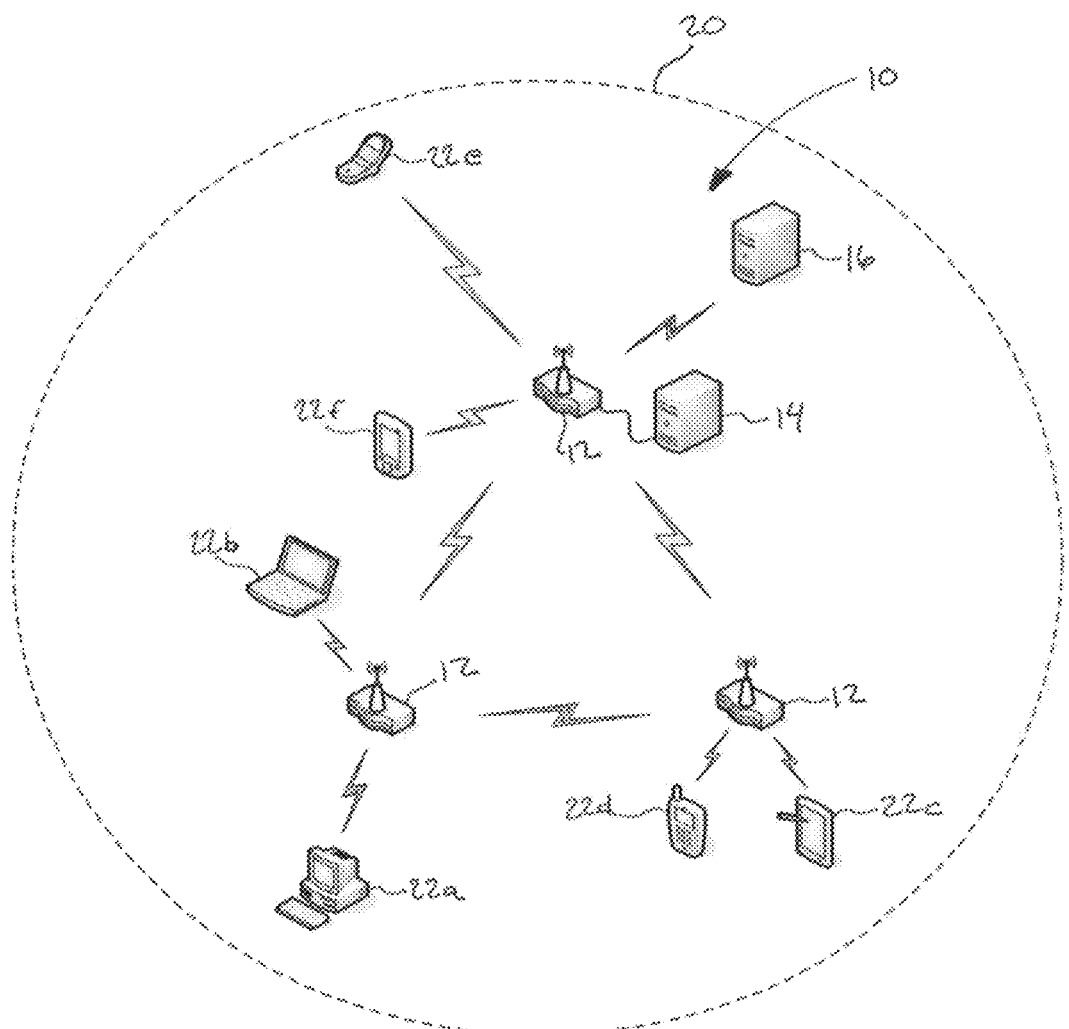
FIG. 1 is a schematic representation of the portable proximity and long range based wireless broadcasting and communication network system in accordance with an illustrative embodiment of the present disclosure.

Referring to FIG. 1, spontaneous and automatic creation of the portable proximity and long range based wireless broadcasting and communication network system 10 occurs whenever one or more networking device(s) 12 are in transmission range, which are accessible via computers and communications devices 22. The computers and communications devices 22 include devices such as, for example, a personal computer (PC) 22a, a laptop computer 22b, a tablet PC 22c, a personal assistant device (PDA) 22d, a mobile phone 22e or a smart phone 22f, or other similar devices, on which may run a user interface in the form of a communication software such as, for example, a web browser.

It is to be understood that, in order to prevent the wireless connection between the networking device(s) 12 from being compromised, the broadcasting and communication network system 10 can also be created via a wired connection.

Figure 2:
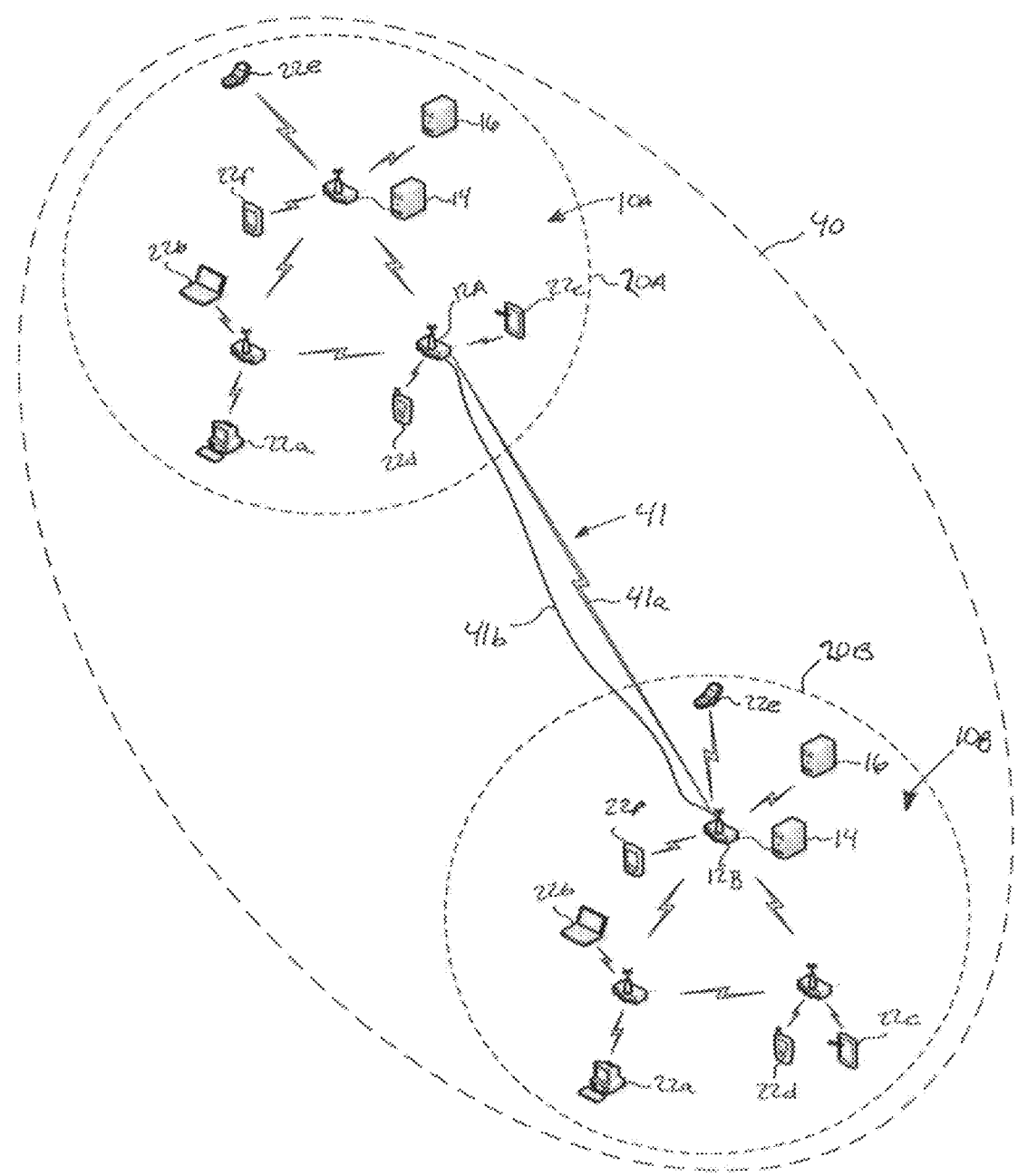
FIG. 2 is a schematic representation of two interconnected portable proximity and long range based wireless broadcasting and communication network systems.

Referring to FIG. 2, peer broadcasting and communication network systems, for example systems 10A and 10B, can be linked together providing a decentralized network 40. The interconnected broadcasting and communication network systems 10A and 10B communicate via a long range link 41 (wireless 41a or wired 41b), for example between networking devices 12A and 12B. The networking devices 12A and 12B can provide basic messaging and broadcasting services and geo location to announce the presence and existence of other broadcasting and communication network systems, i.e. system 10A or 10B, and thus provide synchronization information and allow for communication therebetween to create a larger network 40. It is to be understood that more than two broadcasting and communication network systems can thus be interconnected.

Accordingly, a plurality of decentralized broadcasting and communication network systems 10A, 10B can become a centralized broadcasting and communication network system 40 when the individual broadcasting and communication network systems 10A and 10B are connected via a long range link 41.

The location of any computer and communication devices 22 connected to any networking device(s) 12 can be shared with any other computer and communication devices 22 that are within either of the broadcasting and communication network systems 10A and 10B, i.e. the centralized broadcasting and communication network system 40.

The communication network system(s) 10A, 10B thus created allow for data transfer, sharing, streaming, synchronizing and monetization, and/or all sorts of communications between the interconnected computers and communications devices 22 and networking device(s) 12 (and any other device connected to the networking device(s) 12) without having to go through any type of cellular/mobile network and/or internet service provider, and/or any traditional internet based platforms.

Furthermore, the broadcasting and communication network system(s) 10A, 10B remain immune to third-party shutdowns and blockages of existing communications and data transfer networks, and can broadcast, store, process and synchronize data and provide digital communications of any kind at any given location, in private or public, within a defined geographical location, for example 20A, or any other geographical location, for example 20B, that is available elsewhere via long range link 41.

Data/digital content can be stored on one or more of the networking device(s) 12, a wireless accessible third party external memory apparatus/server 14, a directly connected third party external memory apparatus/server 16 and/or can be stored and accessed on one or more of the interconnected computers and communications devices 22 via permission based access.

Each broadcasting and communication network system 10A, 10B is autonomous, can connect to other broadcasting and communication network system if respective networking devices 12 are in range, via any long range link 41 and/or via a computer and communication device 22 that comes in proximity to a networking device 12 of another broadcasting and communication network system.

Each networking device 12 can simultaneously broadcast to multiple other networking devices 12 and computer and communication device 22. The broadcasting and communication network system(s) 10A, 10B thus formed are available only to those within range 20A, 20B of the networking devices 12 and without requiring any internet connection nor any mobile data network; they are completely independent. However, the broadcasting and communication network system(s) 10A, 10B can, if in presence of any existing internet access, provide internet connectivity, via the networking devices 12 to any connected computer and communication device 22.

Networking Device

The networking device 12 is a broadcasting, networking capable, data storage device configured to store, manipulate, process, distribute and broadcast multimedia data packets, using a processor and software coupled to the data storage device that is configured to broadcast multimedia data packets transmitted to and from the broadcasting and communication network system 10A, 10B.

Figure 3:
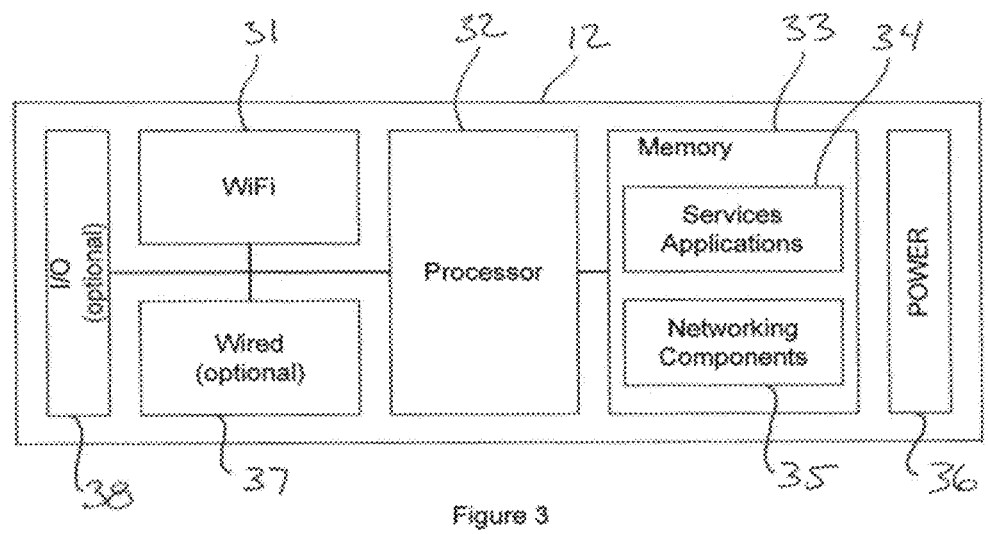
FIG. 3 is a schematic representation of a networking device.

Referring to FIG. 3, the networking device 12 is a portable self-contained networking device that generally includes a WiFi communication interface 31, a processor 32 with an associated memory 33 having stored therein services applications 34 and networking components 35, and a power source 36. Optionally, the networking device 12 may also include a wired communication interface 37, to connect the networking device 12 to another device (e.g. long range link 41, router, server, bridge, repeater, etc.), and/or an input/output (I/O) interface 38, to attach external accessories like a keyboard or a screen, external processing power, memory, etc. The I/O interface 38 can also be used to connect accessories to allow the networking device 12 to behave like a simple computing device such as a portable netbook, tablet PC or digital signage screen with limited functionality.

Services Applications

The networking device 12 can be provided with a memory 33 having stored therein only the networking components 35 or pre-loaded with various services applications 34. Examples of services applications 34 that may be pre-loaded into memory 33, or loaded at a later time, include: web server/web site creation application, e-commerce application, content management application, e-mail application, text messaging (SMS) application, voice over IP (VOIP) application, instant messaging application, blogging and micro-blogging applications, home automation, audio/video streaming, etc.

The networking device 12 can also be provided with a memory 33 having stored therein software that can be downloaded by any computer and communication devices 22 connected to any networking device 12 turning these computer and communication devices 22 into extended access points. These extended access points can then connect to, update, and, but not limited to, synchronize with any existing broadcasting and communication network system 10A, 10B.

The web site creation application consists, for example, of a content management system (CMS), enhanced with custom tools and functionalities according to customer needs. Users can use the CMS, without programming knowledge, to create and maintain a personalized web site with corporate, licensed and/or personal content.

The e-commerce application provides e-commerce capability even when not in the presence of, for example, any type of cellular/mobile network and/or internet service provider, and/or any traditional internet based platforms. This is performed, for example, via the cellular back channel of the user's computer and communication device 22 (1x, Edge, 3G, etc.), by storing in the memory 33 of the networking device 12 all transactions information and then accessing it remotely to gather the info or, in a timely manner, wirelessly transferring this data via a cell/mobile or internet network, using a 3G connection or any similar add on network connection.

The content management application allows the possibility to trigger the download of content/data (e.g. mp3, mpeg, text documents, etc.) via, for example, the cellular back channel of the user's computer and communication device 22 (1x, Edge, 3G, etc.) and/or for offline upload to capture user data such as email, contact info, etc.

The VOIP application can also be pre-configured on the networking device 12, allowing individuals to communicate using the session initiation protocol (SIP) while connected to the internet or an ensemble of interconnected networking devices 12, or any similar networking protocol, allowing individuals to communicate while in proximity and connected to a networking device 12 using a computer and communication device 22 without requiring any internet service or any mobile bandwidth provider.

Networking Components

The networking device 12 is provided with a memory 33 having stored therein networking components 35 having a mesh protocol allowing spontaneous creation of a mesh network with data exchange amongst all networking devices 12 within range of each other. Willingly shared data is automatically pushed to neighboring networking devices 12 to facilitate seamless data transfer and social interactions in order to cater to a larger audience and share the content that resides on each networking device 12, third party external memory apparatus/server 14 and external memory apparatus/server 16, and any of the interconnected computers and communication devices 22.

The networking components 35 include, for example, components providing peer to peer (PnP) networking capabilities: all bandwidth intensive use being distributed among all networking devices 12 and connected computer and communication devices 22.

The networking components 35 allow the networking device 12 to be used in a local area network setting to centralize multimedia content and provide wireless distribution of the multimedia content to Digital Living Network Alliance (DLNA) protocol compatible devices. The networking components 35 also provide, when in presence of any type of internet access, remote access to all this multimedia content from anywhere via any computer and communication device 22 that is connected to the internet. This can be used in a home, at an event, venue, school, mall, airport, etc., in order to connect to a personal cloud and remotely access the content stored on it.

Other components insure that upgrades of the operating firmware, operating system or content are effectuated when a networking device 12 is in proximity to another networking device 12 which has a more updated version and content. Spontaneous transfer/synchronization and update of firmware, operating system and content may also be triggered via a computer and communication device 22 set appropriately.

The networking components 35 may include a secure communications component to allow an individual to connect to an existing networking device 12 using all types of anonymization and security tools like virtual private network (VPN), proxies, pretty good privacy (PGP) encryption, etc.

First Example Use Scenario

The broadcasting and communication network system 10 can be used, for example, for event promotion (e.g. music concerts, festivals, etc.) by giving people access to event information, and downloadable content, directly from their computer and communication device 22 through the one or more networking device(s) 12. Data about the people accessing the broadcasting and communication network system 10 can also be gathered. The one or more networking device(s) 12 can be placed, for example, in a given location (i.e. a park, a public space, a store, etc.) or can be placed on a moving platform (i.e. a promotion vehicle, etc.).

Second Example Use Scenario

The broadcasting and communication network system 10 can be deployed in a business location, for example in a café, where customers can access the café's web page, using their computer and communication device 22, to order or buy café's products, as well as download or access digital promotions, digital content (e.g. music, videos, news feeds, etc.) and/or also be capable to communicate with others connected within proximity of the local area store network.

Third Example Use Scenario

The broadcasting and communication network system 10 can be used in emergency situations to provide simple messaging services, deploy beacons emitting specific information or provide more complex services such as VOIP (to provide an ad hoc communications network), chat, blogging, micro-blogging, instant messaging or any similar services, file sharing and browsing, etc. The various services can be used to gather, inform, manage and help people in disaster/emergency situations and be used, for example, by the military, government, and/or cities/municipalities in order to broadcast information related to any current event/situations, disaster recovery efforts or digital activism, humanitarian rights movement/information.

Further Example Uses

The broadcasting and communication network system 10 can also be used to provide information and downloadable content at conferences, schools, broadcast touristic and historic information within a particular area, transportation schedules (for example at a train station or bus stop). It can also be used for commercial purposes such as marketing, promotion, sales, transactional, to broadcast information about a company during trade shows, or by shops or restaurants to inform their customers about their products and take orders even during closed hours, an/or provide promotions within proximity, as well as for gaming by providing a local multi-player gaming area. The broadcasting and communication network system 10 can further be used to allow individuals to broadcast their own content, like blogs, web pages, files, micro-blogging, music, video, etc.

The broadcasting and communication network system 10 can further be used to provide internet connection in transports (cars, bus, train, plane, boat, etc.) as well as within industrial design objects and electronics.

In all of the above example scenarios, the accessible information and downloadable content can be provided by one or more of the networking device(s) 12 through one or more services application 34 (see FIG. 2), by a third party external memory apparatus/server 14 or by a directly connected third party external memory apparatus/server 16 (see FIG. 1).

Although the present disclosure has been described by way of particular embodiments and examples thereof, it should be noted that it will be apparent to persons skilled in the art that modifications may be applied to the present particular embodiment without departing from the scope of the present disclosure.

What is claimed is:

1. A networking device for creating a portable proximity communication network, comprising:
    a communication interface; and
    a networking component for autonomously establishing a connection of the networking device, via the communication interface, with a node located beyond a range of the portable proximity communication network;
    wherein the networking component is configured to announce a presence of the networking device by broadcasting its geographical location via the communication interface, the geographical location being defined by the range of the portable proximity communication network.

2. The networking device of claim 1, wherein the networking component is capable of establishing a connection with a portable communication device.

3. The networking device of claim 2, wherein the networking component is capable of establishing a communication between the portable communication device and a server.

4. The networking device of claim 1, wherein the networking component is capable of autonomously establishing connections with a plurality of nodes located beyond the range of the portable proximity communication network.

5. The networking device of claim 1, wherein the networking component is capable of autonomously establishing a connection with a peer networking device located beyond the range of the portable proximity communication network for creating a long range based communication network.

6. The networking device of claim 1, wherein the communication interface is a wireless communication interface.

7. The networking device of claim 1, wherein the node located beyond the range of the portable proximity communication network is part of peer portable proximity communication network.

8. The networking device of claim 7, wherein the networking device is configured to provide synchronization information to allow communication between the portable proximity communication network and the peer portable proximity communication network.

9. The networking device of claim 1, wherein networking device is capable of communicating over a long range wireless communication link with the node located beyond the range of the portable proximity communication.

10. The networking device of claim 1, wherein the networking component uses one or more of a mesh protocol and a peer to peer network protocol.

11. The networking device of claim 1, further comprising an input/output interface configured for attachment of an external accessory to the networking device.

12. A system for creating a portable proximity communication network, comprising:
    a plurality of communication devices; and
    a networking device comprising:
        a communication interface, and a networking component for autonomously establishing connections of the networking device, via the communication interface, with any one of the plurality of communication devices and with a node located beyond a range of the portable proximity communication network;
    wherein the networking component is configured to announce a presence of the networking device by broadcasting its geographical location via the communication interface, the geographical location being defined by the range of the portable proximity communication network.

13. The system of claim 12, comprising:
two networking devices, each network device establishing connections with distinct pluralities of communication devices; and
a communication link established between the two networking devices.

14. The system of claim 13, wherein the networking component of one of the two networking devices uses a mesh protocol to establish the communication link with another one of the two networking devices.

15. A method for creating a portable proximity communication network, comprising:
detecting presence of one or more communication devices in transmission range of a networking device;
autonomously establishing a connection of the networking device with one of the one or more communication devices;
autonomously establishing a connection of the networking device with a node located beyond a range of the portable proximity communication network; and
announcing a presence of the networking device by broadcasting its geographical location via a communication interface, the geographical location being defined by the range of the portable proximity communication network.

16. The method of claim 15, comprising autonomously establishing a connection between the networking device and a peer networking device located beyond the range of the portable proximity communication network for creating a long range based communication network.

17. The method of claim 16, comprising transferring data between two communication devices connected to any one of the networking device and peer networking device.

\* \* \* \* \*